INVENTORS.
H.L.Blood, R.H.Rausch,
C.W.Jensen and H.Little.
BY
ATTORNEY.

Patented Nov. 10, 1925.

1,560,653

UNITED STATES PATENT OFFICE.

HAROLD L. BLOOD, OF NORTH PLAINFIELD, AND ROSWELL H. RAUSCH, CHARLES W. JENSEN, AND HARRY LITTLE, OF PLAINFIELD, NEW JERSEY, ASSIGNORS TO NILES-BEMENT-POND COMPANY, OF NEW YORK, N. Y., A CORPORATION OF NEW JERSEY.

MACHINE TOOL.

Application filed July 9, 1923. Serial No. 650,421.

*To all whom it may concern:*

Be it known that we, HAROLD L. BLOOD, a citizen of the United States, residing at North Plainfield, in the county of Somerset and State of New Jersey, ROSWELL H. RAUSCH, CHARLES W. JENSEN, and HARRY LITTLE, citizens of the United States, and residents of Plainfield, in the county of Union and State of New Jersey, have invented certain new and useful Improvements in Machine Tools, of which the following is a specification.

This invention relates to tool operating mechanism for planers and like machines. Such machines ordinarily comprise a work table and one or a pair of uprights adjacent the table. A cross rail is mounted on the uprights and tool heads may be supported on the cross rail and on the uprights beneath the rail. The first said heads are ordinarily termed the "rail heads" and the second said heads are ordinarily termed the "side heads". Specifically our invention relates to mechanism for elevating and clamping the rail on the said upright or uprights and for feeding and traversing the tool heads. The primary object of the invention is to provide an improved mechanism for performing these functions.

The present invention provides an electric motor, preferably on the cross rail, and mechanism operated thereby for intermittently feeding the tool supports, for continuously traversing the tool supports in either direction and for moving the cross rail on the uprights. Mechanism, including a manually operable clamping shaft extending along the rail, is provided for clamping the rail to the uprights. Connections are also provided between the clamping mechanism and the motor operated mechanism whereby the motor will be operatively connected to the tool supports when the rail is clamped and will be disconnected therefrom and operatively connected to the rail elevating mechanism when the rail is unclamped. One object of the invention is therefore to provide a tool operating mechanism embodying these improved features.

The motor is adapted to feed and traverse the tool supports on both the cross rail and uprights of the machine. Mechanism is provided on the cross rail for traversing all such tool supports from the motor and for feeding all such supports the desired amount therefrom. The feeding mechanism preferably comprises a plurality of relatively adjustable stops for definitely limiting the feeding movement of the motor and feeding mechanism. Another object of our invention is to provide a novel arrangement of elements and mechanism for performing these various functions.

The feeding and traversing mechanisms are so related that either may be operated from the motor independently of the other. The mechanism for providing such operation comprises a pair of clutches and connections thereto whereby when any tool support is in traversing connection with the motor the feeding clutch to the motor will be disengaged. It is another object of our invention to provide mechanism for performing these functions.

A switch is provided on the cross rail for controlling the continuous rotation of the motor in either direction whereby to traverse the tool supports and to move the cross rail on the uprights. It is an object of our invention to provide means to prevent the operation of this switch when the motor is connected up for feeding, means being provided however for automatically disconnecting the feeding connection when placing the operating mechanism in position for either traversing the tool supports or moving the cross rail.

Another object of our invention is to provide improved means for feeding and traversing the side heads from the motor. This improved means includes various clutches and connections so interconnected that the side heads may be traversed together or independently and may be likewise fed together with the rail heads or independently thereof. The said connections also function to automatically engage or disengage the side head clutches to correspond with the other operating parts of the machine.

With the above and other objects in view, our invention consists in the features of construction and operation set forth in the following specification and illustrated in the accompanying drawings. In such drawings annexed hereto and forming a part of this specification, we have shown certain embodiments of our invention in a planer, but it will be understood that the invention can be otherwise embodied and that the drawings are not to be construed as defining or limiting the scope of the invention, the claims appended to this specification being relied upon for that purpose.

Referring to the figures of the drawings:

Fig. 2ª is an enlarged detail view of a side head ratchet pinion.

In the drawings, 1 indicates the bed of a planer having a work table 2 slidably mounted thereon and a pair of uprights 3 respectively at opposite sides of the table. A cross rail 4 is mounted to slide vertically on the uprights and is adapted to slidably support a pair of tool head saddles 5 and 6 thereon. Side head saddles 7 and 8 are respectively supported on the uprights beneath the cross rail. The table 2 is adapted to be reciprocated from a motor 9 and such reciprocation is automatically controlled by a pilot switch 10 operated by table dogs 11 operating on switch arms 12. This mechanism and its operation are more fully described in Patent No. 1,299,192. The movements of the table may be controlled by means of a pendent switch 13 which is described in detail in reissue Patent No. 14,540 dated October 22, 1918.

An electric motor 14 is mounted on a rearwardly extending bracket 14' on the cross rail and, as illustrated in the drawings, this motor is adapted to feed and traverse the tool supports and to move the cross rail on the uprights. Manually operated means, hereinafter described, is provided for clamping the cross rail to the uprights. This means and the mechanism cooperating with the motor for performing the said functions will now be described.

A bevel gear on the motor shaft 15 is in mesh with a bevel gear 16 loose on the forward end of a shaft 17 extending along the cross rail 4. A clutch 18 is splined to the shaft 17, the adjacent ends of the clutch and bevel gear 16 having cooperating clutch teeth. A spring 19 is adapted to normally engage the clutch with the bevel gear whereby to drive the shaft 17. The clutch may be disengaged by means of a sliding rod 20 carrying a yoke 21 connected to the clutch. The shaft 17 is termed the "backside head shaft" since it operates through mechanism hereinafter described to feed and transverse the back side head 8.

The cross rail 4 is supported on the uprights by means of a pair of nuts 22 journaled in the rail and respectively threadedly engaging a pair of screws 23 non-rotatably mounted in the uprights. The nuts are provided with worm wheels thereon engaged by worms 24 on a shaft 25 extending along the rail parallel with the shaft 17. The rail elevating shaft 25 is driven from the shaft 17 through a pair of spur gears 26 and 27, the gear 26 being keyed to the shaft 17 and the gear 27 being loose on the shaft 25. A clutch 28 is adapted to operatively connect the gear 27 to its shaft, a spring 29 between a collar 30 and the said clutch normally moving the clutch into engagement.

Figures 7, 8, 9, 10, 11:
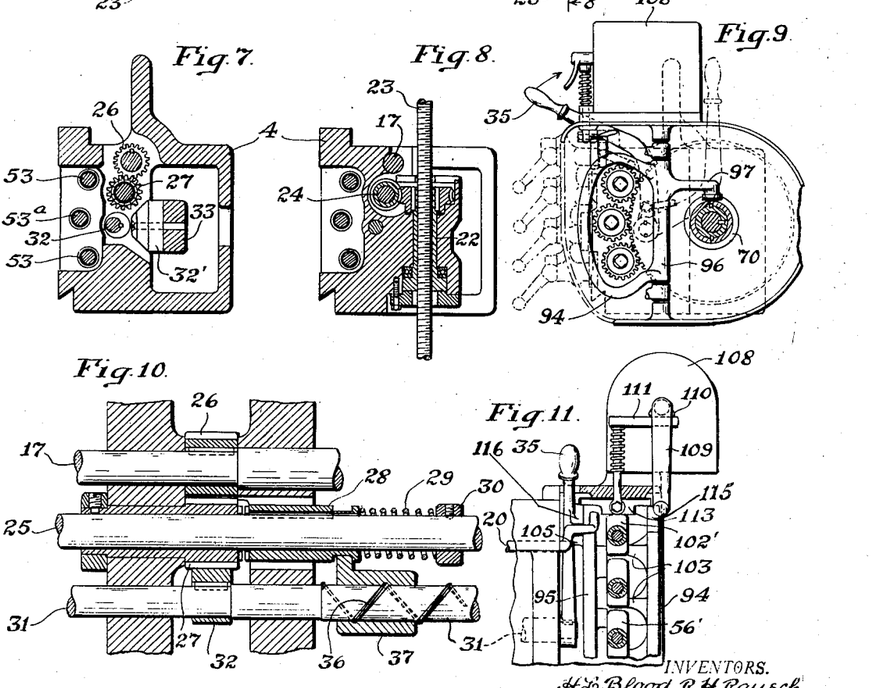
Fig. 7 is a cross sectional view thereof taken on line 7—7 of Fig. 6.
Fig. 8 is a cross sectional view taken on line 8—8 of Fig. 6.
Fig. 9 is a fragmentary end view of the rail, certain parts thereof being omitted.
Fig. 10 is an enlarged fragmentary detail view of mechanism shown in Fig. 6.
Fig. 11 is a fragmentary detail view taken approximately on line 11—11 of Fig. 4.

A manually operable rail clamping shaft 31 is mounted in the rail parallel with the shafts 17 and 25. This shaft carries an eccentric 32 adapted to operate on a block 32' on the inner ends of a pair of clamping levers 33. The levers are loosely bolted to the rail at 34 and the short arms thereof engage the uprights. Rotation of the shaft and eccentric to the position shown in Figs. 7 and 9 forces the clamping levers into clamping engagement with the uprights. An operating handle 35 is provided on the forward end of the clamping shaft 31. The clamping shaft is also provided with a steep pitched thread 36 thereon in engagement with a yoke collar 37 connected to the clutch 28. Rotation of the shaft 31 to clamp the cross rail to the uprights (Fig. 7), operates to withdraw the clutch to the disengaged position shown in Fig. 10. Rotation of the shaft in the direction to unclamp the rail (see arrow, Figs. 3 and 9) permits the spring 29 to engage the clutch. In Figs. 7, 9 and 10, the mechanism is shown in the rail clamping position.

A bevel gear 38 keyed to the rear end of the shaft 17 is in mesh with a bevel gear 39 keyed to the forward end of a short shaft 40 journaled in a bracket 41 on the rail. A worm 42 loose on the shaft 40 is in mesh with a worm wheel 43 splined for axial movement on the back side head vertical feed shaft 44. A clutch 45 is splined to the shaft 40 rearwardly of the worm and a spring 46 between a bushing 47 and the clutch normally engages the clutch with the worm, the adjacent faces of the clutch and worm being provided with cooperating clutch teeth. The vertical shaft 44 is operatively connected to the side head 8 to feed and traverse the same in the manner hereinafter specifically described in reference to the side head 7.

Figure 12:
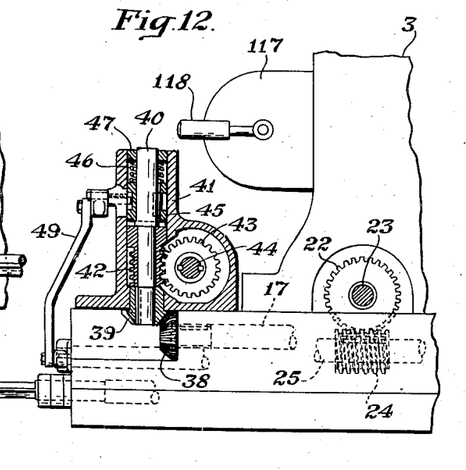
Fig. 12 is a fragmentary plan view partially in section of the rear end of the cross rail.
Figure 13:
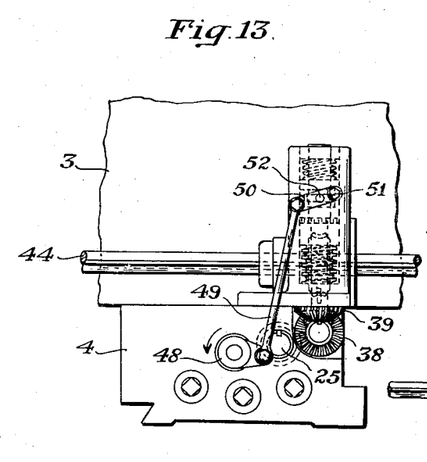
Fig. 13 is an end elevation thereof.

The clutch 45 is automatically disengaged, when preparing to move the rail on the uprights by the following mechanism: The rear end of the clamping shaft 31 carries an arm 48 which is connected by a link 49 to an arm 50 pivoted at 51. The arm 50 is connected to the clutch 45 at 52. In Figs. 12 and 13, the shaft 31 is shown in the rail clamping position and the clutch is closed. When the shaft is rotated to unclamp the rail (in the direction of the arrow, Fig. 13), the connection including the link 49 will disengage the clutch. As thus far described, it will be understood that movement of the clamping shaft 31 to clamp the rail disengages the clutch 28 and engages the clutch 45 and movement of the shaft to unclamp the rail disengages the clutch 45 and engages the clutch 28.

The threaded shafts or screws 53 are provided on the cross rail for respectively moving the tool saddles 5 and 6 therealong and a splined shaft 53ª is provided for moving the tools vertically in the saddles in the usual manner. A pinion 54 is loosely mounted on the forward end of each screw shaft and a rachet pinion 55 is non-rotatably and slidably mounted thereon adjacent each pinion 54. The pinions 54 and 55 are provided with cooperating clutch teeth on their adjacent faces whereby the inner non-rotatable portion of the pinion 55 may be engaged with the pinion 54. Operating handles 56 are provided for shifting the pinions 55. Two large gears 57 and 58 on a shaft 59 parallel with the screw shafts are respectively adapted to operate the pinions 54 and 55. The gear 57 is in mesh with the pinions 54, and the pinions 55 are adapted to be slid into meshing engagement with the gear 58. The gear 57 is adapted to be continuously rotated in either direction for traversing the tool supports and the gear 58 is adapted to be intermittently rotated for feeding the tool supports, all of which mechanism is hereinafter more specifically described.

Figure 3:
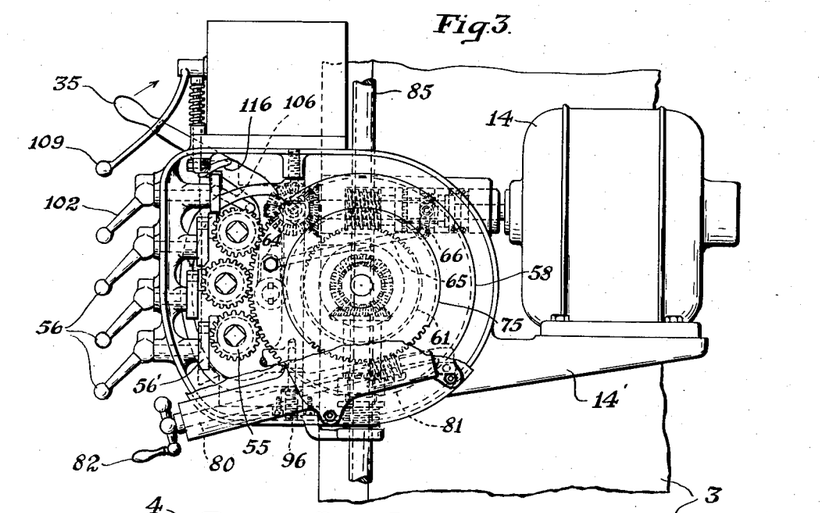
Fig. 3 is an enlarged front end elevation of the cross rail
Figure 4:
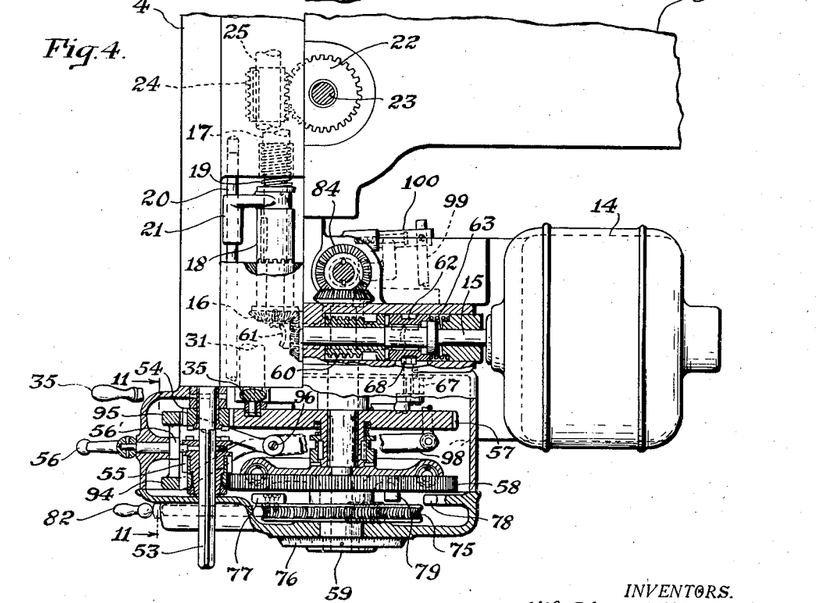
Fig. 4 is a fragmentary plan view thereof, partially in section.
Figure 5:
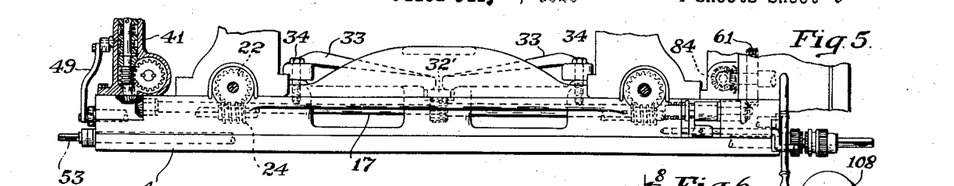
Fig. 5 is a plan view of the cross rail shown in Fig. 2.
Figure 6:
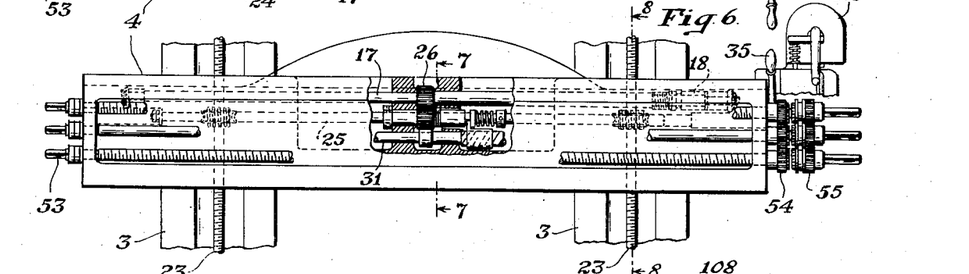
Fig. 6 is a front elevation thereof.

Loosely mounted on the motor shaft 15 is a worm 60 in mesh with a worm wheel 61 keyed to the shaft 59. A clutch 62 splined to the shaft 15 is normally forced into driving engagement with the worm by means of a spring 63. An arm 64 on the clamping shaft 31 is connected by a link 65 to an arm 66 pivoted at 67. The arm 66 is connected to the clutch 62 at 68. In Figs. 3 and 4, the clamping shaft 31 is shown in the rail clamping position and the clutch 62 is closed. When the shaft is rotated to unclamp the rail (in the direction of the arrow Fig. 3), the connection including the link 65 will disengage the clutch. Thus the tool feeding and traversing connection to the shaft 59 is automatically disengaged when the rail clamps are released preparatory to moving the rail on the uprights.

The gear 57 is keyed to the shaft 59 and such gear is therefore directly connected with the motor when the clutch 62 is closed. The gear 58 is loose on the shaft 59, as is also an adjacent driving member 69 therefor. The hub of the member 69 is provided with clutch teeth adapted to be engaged by a clutch 70 splined to the hub of the gear 57. A spring 71 normally operates to engage the clutch with the member 69. The adjacent faces of the gear 58 and member 69 are formed with arcuate depressions 72 forming two substantially 90° recesses between such elements for receiving compression springs 73 therein. As thus constructed, the drive from the member 69 to the gear 58 is entirely through these springs. The arrangement is such that the springs yield sufficiently to permit a slight shock absorbing rotation of the element 69 relative to the gear 58 in either direction.

A bushing 74, loosely mounted on the outer end of the shaft 59, has a worm wheel 75 keyed to its inner end and a dial 76 pinned to its outer end. The inner face of the worm wheel carries a stop 77 cooperating with a fixed stop 78. The gear 58 carries a stop 79 operating between the stops 77 and 78, the two latter stops being adapted to positively limit the rotation of the gear 58 in the opposite directions respectively. A shaft 80 has a worm 81 thereon in mesh with the worm wheel 75. The shaft and worm may be rotated by a handle 82 to adjust the stop 77 relative to the stop 78, the dial 76 being adapted to indicate the amount of such adjustment.

In Fig. 4, one each of the feeding and traversing pinions 55 and 54 are shown in section and the feeding pinion 55 is shown in the neutral position. When it is desired to traverse one or both rail heads 5 and 6, the proper pinion or pinions 55 are shifted into clutching engagement with the adjacent pinions 54. A direct connection is thereby established from the motor to the screw 53.

Figures 1, 2, 2A:
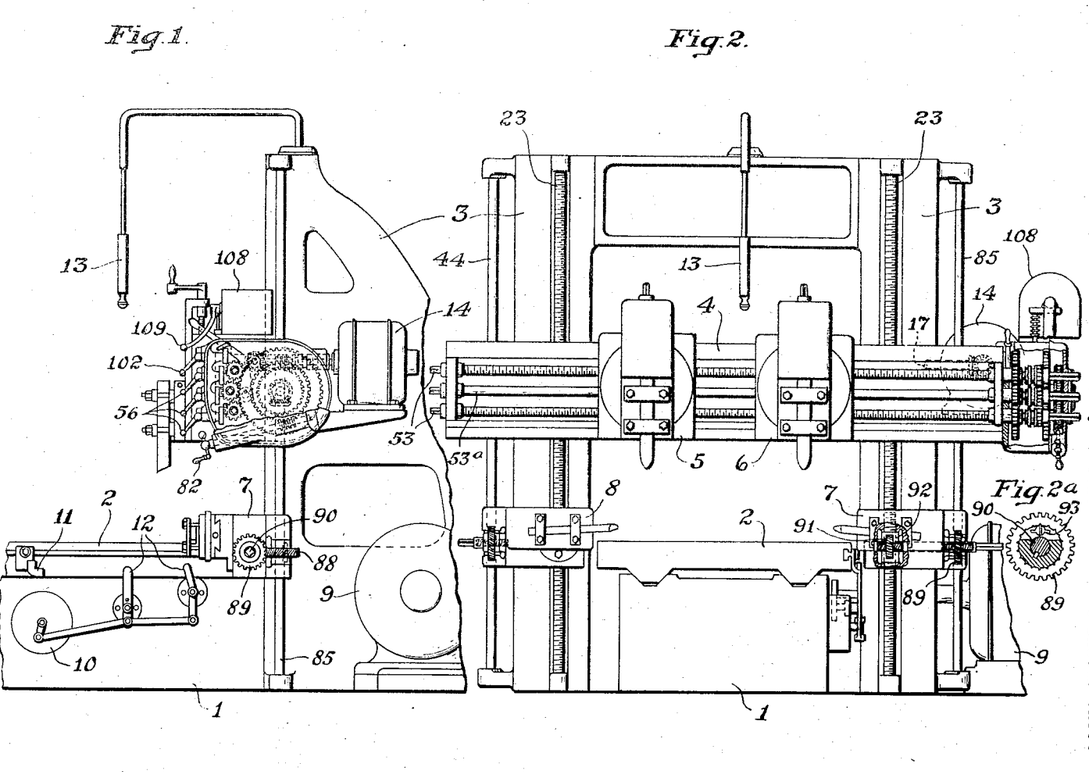
Figure 1 is a side elevation of a planer embodying our invention.
Fig. 2 is a front elevation thereof.

When it is desired to feed one or both rail heads, the proper pinion or pinions 55 are slid into meshing engagement with the feed gear 58. The spring 71 closes the clutch 70. The pilot switch 10 which operates the motor 9 to automatically reciprocate the table 2 also controls the motor 14 as specifically defined in the before mentioned patent and copending application. Thus, as the table is reciprocated, the motor 14 rotates synchronously therewith first in one direction and then in the opposite direction. The opposite rotations of the gear 58 are limited by the stops 77 and 78 which stop the rotation of both the gear and motor. The travel of the gear is stopped positively while the springs 73 permit a slight over-travel of the motor and member 69, thus relieving the motor and its mechanism of the shock incident to the stops while at the same time securing a definite and accurate feeding movement of the gear 58. It will be understood that the pinions 55 are each provided with the usual ratchets therein (such as hown in Fig. 2ª) for imparting rotary movement to their shafts or screws in one of the other direction as desired.

The front side head 7 may be fed and traversed on its upright 3 from the shaft 59 as follows: A bevel gear 83 on the inner end of the shaft 59 is in mesh with a bevel gear 84 loose on the front side head vertical shaft 85. A clutch 86 splined to this shaft is adapted to connect the bevel gear 84 to the shaft. A spring 87 normally holds the clutch in engagement. A spiral gear 88 splined to the vertical shaft 85 is in mesh with a ratchet spiral gear 89 on the side head feeding shaft 90. A spiral gear 91 on the inner end of this shaft is in mesh with a spiral gear on the nut 92. This nut is threaded to the upright screw 23 and supports the side head 7. It will therefore be seen that the nut 92 may be rotated from the feeding and traversing shaft 59 in the same manner as the screws 53 are rotated, the pawl 93 being adapted to drive the nut in one direction or the other as desired.

As thus far described, it will be noted that the rail heads 5 and 6 and the side heads 7 and 8 may all be both fed and traversed from the motor 14. The feeding movement of the motor and its cooperating mechanism is limited by the stops 77 and 78. Such stops positively and accurately limit the travel of the gear 58 while the motor and shaft 59 have a slight over-travel. The feeding of the rail heads will therefore be very definite while the side heads which are driven from the motor and shaft 59 will have a slight over-travel, due to the shock absorbing compression of the springs 73. Such over-travel however is not sufficient to be objectionable.

The feed clutch 70 is normally closed by the spring 71 and the front side head clutch 86 is normally closed by the spring 87. Means now to be described is provided for automatically shifting these clutches, as well as the clutch 18, when making certain adjustments. Two yokes 94 and 95, respectively operative to shift clutches 70 and 86, are mounted on a vertical pivot 96. The yoke 94 has a rearwardly extending arm 97 connected by a rod 99 to one arm of a bell crank 100 pivoted at 101. The other arm of the bell crank engages the clutch 86.

The portions of the yokes forwardly of the pivot 96 extend vertically along the rail clutch shifters 56'. Each clutch shifter is oblong in shape and comprises a portion extending above its center of rotation and another portion extending below such center. Above the clutch shifters 56' is an additional shifter 102' adapted to be operated by a handle 102 for a purpose hereinafter described. The yoke 94 has a projection 103 extending inwardly to the lower portion of each shifter (Fig. 11). The yoke 95 has a projection 104 extending inwardly to the upper portion of each clutch shifter 56', the uppermost projection 104' also lapping over the lower portion of the shifter 102'. The upper end of the yoke 95 also has a projection 105 to engage the angular end 106 of the clutch shifting rod 20.

When the pinions 55 are in the neutral position illustrated in Fig. 4 or in mesh with the gear 58, the clutches 18, 70 and 86 are engaged for feeding. Any movement of the handles 56 to the left to engage the pinions 55 with the pinions 54 for traversing the rail heads, automatically moves the forward portions of the yokes 94 and 95 outwardly (Fig. 11) and disengages the clutches 18, 70 and 86. Thus both side head clutches and the feeding clutch are disengaged and the rail heads may then be traversed as desired.

Figures 14, 15, 16, 17, 18:
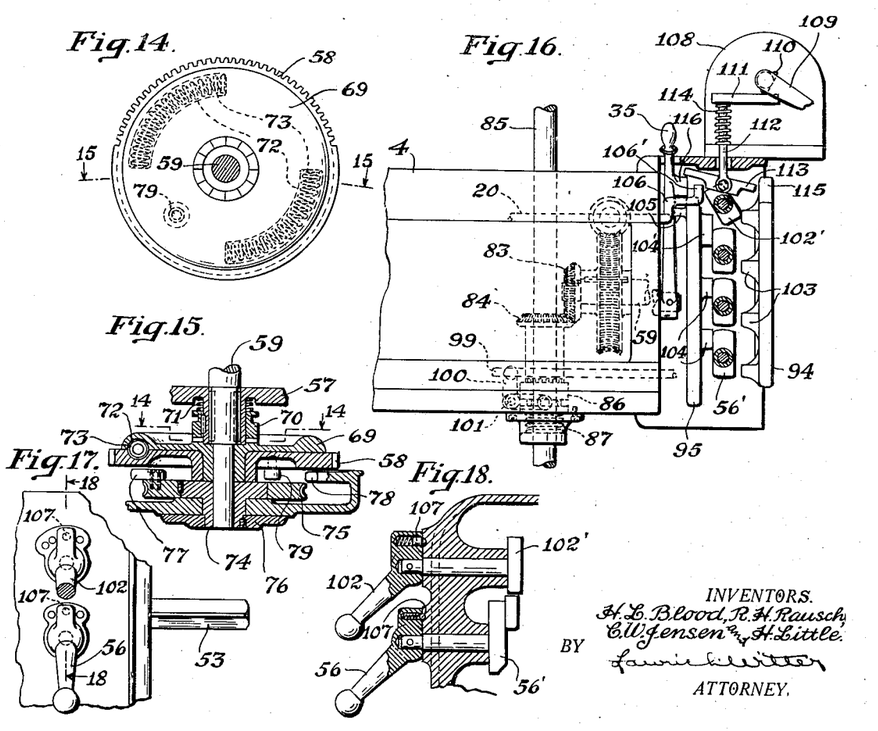
Fig. 14 is a detail view taken on line 14—14 of Fig. 15.
Fig. 15 is a sectional view taken on line 15—15 of Fig. 14.
Fig. 16 is a view similar to Fig. 11 but showing certain parts in another position.
Fig. 17 is an enlarged fragmentary view of a detail.
Fig. 18 is a sectional view taken on line 18—18 of Fig. 17.

When it is desired to traverse the side heads, the handle 102 is rotated to the position shown in Fig. 16, which movement disengages the feed clutch 70. The pinions 55 being in the neutral position, the side heads may be traversed as desired. If it is desired to traverse only the front side head 7, the handle 102 is rotated further to the left (Fig. 16) to engage the upper portion of the shifter 102' with the vertical end 106' of the rod 20. Such movement disengages the back side head clutch 18. To position only the rear side head 8, the front side head connection should be rendered inoperative by placing its pawl 93 in the neutral position. Both side heads clutches 18 and 86 may be disengaged by rotating the handle 102 to the right to force the yoke 95 outwardly. The shifter handles 56 and 102 are each provided with a spring pressed detent 107 cooperating with depressions, as illustrated in Figs. 17 and 18, for retaining the shifters in their various positions of adjustment.

As before stated, the motor 14 is automatically controlled for feeding by the table operated pilot switch 10 as fully described in the said copending application. The motor may be operated continuously in either direction for traversing by means of a controller switch 108 mounted on the forward end of the cross rail. Rotation of the controller handle 109 in one direction is adapted to rotate the motor in one direction and rotation of the handle in the opposite direction is adapted to rotate the motor in the opposite direction. Interlocking means now to be described is provided for positively preventing the operation of this switch to continuously operate the motor except when the mechanical connections are in proper position for performing traversing operations.

Rigid on the controller shaft is a cam 110 against the lower straight side of which bears a plate 111. A rod 112 supporting this plate extends downwardly through the housing where it is pivotally connected to a bar 113. A spring 114 surrounding the rod normally holds the parts in the position shown in Fig. 11. As shown in Fig. 11, the upper end 115 of yoke 94 extends beneath one end of the bar and a projection 116 on the clamping handle 35 extends beneath the other end of the bar. The bar and plate 111 are therefore positively held against downward movement and the controller shaft cannot be rotated. When the yoke 94 is moved outwardly to disengage the feed clutch 70, as shown in Fig. 16, the end 115 is removed from beneath the bar 113 and the latter may pivot about its other end. The controller may thereupon be operated to traverse the tool heads. When the clamping handle 35 is moved to its unclamping position, the projection 116 is removed from beneath its end of the bar and the latter may pivot about its other end. The controller may thereupon be operated to traverse the rail on the uprights.

As illustrated in Fig. 12, a second controller switch 117 is provided on the rear upright 3. This controller may be operated by a handle 118 to continuously rotate the motor in either direction. The function of this controller is to provide the operator with a means to operate the back side head 8 from a position adjacent such head. Well known spring means (not illustrated) is provided for normally holding the handle 118 in its neutral and inoperative position. It will be understood that this controller is used very infrequently and it is therefore unnecessary to interlock the same with the mechanical connections in the manner above described in reference to the controller 108.

It is believed that the operation of the mechanism will be clear from the above description. A brief summary of the operation, however, is given as follows: The drawings show the rail 4 clamped to the uprights 3 and the ratchet pinions 55 in the neutral position. In such position, the clutches 62, 70, 86, 18 and 45 are engaged. The rail elevating clutch 28 is disengaged. Ratchet pinions 55 being in neutral, only the side heads 7 and 8 are operatively connected to the motor. To render either side head inoperative, it is only necessary to place the pawl 93 thereof in the neutral position. The back side head 8 may also be rendered inoperative by operating the handle 102 to disengage the clutch 18. Thus the motor may be operated to feed either or both side heads, or, if desired, the pinions 55 may be meshed with the gear 58 whereby to also feed the cross rail heads. To render both side heads inoperative, it is only necessary to rotate the shifter handle 102 to the right to disengage the clutches 18 and 86 as heretofore described, the detent 107 being adapted to hold the clutches so disengaged. It should be particularly noted that both the rail heads and side heads are fed from a single mechanism on the rail, thus eliminating the usual separate feeding mechanisms for the rail and side heads and requiring the adjusting of only a single feeding mechanism for all such heads. It will also be noted that the various adjustments provide for feeding and traversing all the tool supports simultaneously, independently or in any combination desired.

When desiring to traverse either or both rail heads, the pinions 55 are shifted into clutching engagement with the pinions 54. Such movement of the shifting levers 56 automatically disengages the side head clutches 18 and 86 and the main feed clutch 70 as heretofore described. The obstruction 115 is also removed from beneath the bar 113 (Fig. 16) so that the switch handle 109 may be moved to operate the motor 14 in either direction. The side heads may be traversed independently of the rail heads upon adjusting the clutches by means of the handle 102 in the manner heretofore described.

When desiring to traverse the cross rail, the clamping lever 35 is moved to the dot and dash line position shown in Fig. 9. This movement disengages the clutch 62 and the side head clutches 18 and 45 and engages the elevating clutch 28. Movement of the handle 35 also removes the projection 116 from beneath the bar 113 whereby the switch handle 109 may be operated to continuously operate the motor in either direction and to move the rail on the uprights.

It will be noted that the invention provides a mechanism wherein the several operating parts are so interlocked that adjustment of any of such parts to perform certain functions automatically adjusts all cooperating parts to their proper corresponding positions. The operator is thereby relieved of considerable responsibility and the possibility of error and damage is reduced to a minimum. It will furthermore be noted that the interlocking mechanism on the controller switch 109 positively prevents operation thereof for traversing purposes whenever the feeding mechanism is engaged.

What we claim is:

1. In a machine tool, the combination of an upright, a cross rail thereon, tool supports on the upright and cross rail, an electric motor, and operative connections from the motor to the tool supports for feeding and traversing the same, the said connections including a unitary mechanism for feeding said tool supports a predetermined amount and the mechanism being adjustable to vary such amount.

2. In a machine tool, the combination of an upright, a cross rail thereon, tool supports on the upright and cross rail, power means, and operative connections from the power means to the tool supports for feeding and traversing the same, the said connections including a unitary mechanism for intermittently feeding said tool supports a predetermined amount and the mechanism being adjustable to vary such amount.

3. In a machine tool, the combination of an upright, a cross rail thereon, tool supports on the upright and cross rail, power means, and operative connections from the power means to the tool supports for feeding and traversing the same, the said connections including a unitary mechanism for intermittently feeding said tool supports a predetermined amount, the mechanism being adjustable to vary such amount and the said connections being operative to operate the respective upright and cross rail supports either independently or together.

4. In a machine tool, the combination of an upright, a cross rail thereon, tool supports on the upright and cross rail, a power element, and operative connections from the power element to said tool supports for feeding and traversing the same, the said connections including mechanism on the rail for intermitently feeding said tool supports a predetermined amount and the mechanism being adjustable to vary such amount.

5. In a machine tool, the combination of an upright, a cross rail thereon, tool supports on the upright and cross rail, an electric motor, and operative connections from the motor to the tool supports for feeding and traversing the same, the said connections including a unitary mechanism on the rail for feeding said tool supports a predetermined amount and the mechanism being adjustable to vary such amount.

6. In a machine tool, the combination of a pair of uprights, a cross rail thereon, tool supports on the uprights and cross rail, an electric motor, and operative connections from the motor to the tool supports for feeding and traversing the same, the said connections including mechanism on the rail for intermittently feeding said tool supports a predetermined amount and the mechanism being adjustable to vary such amount.

7. In a machine tool, the combination of a pair of uprights, a cross rail thereon, tool supports on the uprights and cross rail, an electric motor, and operative connections from the motor to the tool supports for feeding and traversing the same, the said connections including mechanism on the rail for feeding the tool supports a predetermined amount, the mechanism being adjustable to vary such amount and the said connections being operative to operate the several tool supports either independently or together.

8. In a machine tool, the combination of an upright, a cross rail thereon, tool supports on the upright and cross rail, an electric motor on the rail, and operative connections from the motor to the tool supports for feeding and traversing the same, the said connections including a mechanism on the rail for intermittently feeding said tool supports a predetermined amount and the mechanism being adjustable to vary such amount.

9. In a machine tool, the combination of an upright, a cross rail thereon, tool supports on the upright and cross rail, power means, and operative connections from the power means to the tool supports for feeding and traversing the same, the said connections including mechanism on the rail for intermitently feeding the side heads a predetermined amount and the mechanism being adjustable to vary such amount.

10. In a machine tool, the combination of an upright, a cross rail thereon, tool supports on the upright and cross rail, an electric motor on the rail, and operative connections from the motor to the tool supports for feeding and traversing the same, the said connections including mechanism on the rail for feeding the side heads a predetermined amount and the mechanism being adjustable to vary such amount.

11. In a machine tool, the combination of an upright, a cross rail thereon, tool supports on the upright and cross rail, an electric motor, tool support feeding and traversing elements respectively on the rail, operative connections from the motor to the elements, adjustable means for limiting the feeding movement of the feeding element, and operative connections from the elements to the tool supports.

12. In a machine tool, the combination of an upright, a cross rail thereon, tool supports on the upright and cross rail, an electric motor, a rotary tool support traversing element on the rail, an oscillatory tool support feeding element on the rail, operative connections from the motor to the elements, adjustable means for limiting the oscillatory movements of the feeding element, and operative connections from the elements to the tool supports.

13. In a machine tool, the combination of an upright, a cross rail thereon, tool supports on the upright and cross rail, an electric motor, tool support feeding and traversing mechanism including a shaft on the rail, operative connections from the motor to the said mechanism, operative connections from the mechanism to the rail tool supports, and an operative connection from the shaft to the upright tool support, the said mechanism and connections being adapted to optionally traverse the tool supports continuously in either direction or intermittently feed the same a predetermined amount and the feeding and traversing of the upright support being entirely through the said shaft.

14. A tool feeding mechanism for planers or the like comprising in combination, a tool support, an electric motor, an operative connection from the tool support to the motor including a rotary element, a stop on the element, and a pair of relatively adjustable abutment stops in the path of movement of the first stop for mechanically and definitely stopping the respective opposite rotations of the element and motor.

15. A tool feeding mechanism for planers or the like comprising in combination, a tool support, an electric motor, an operative connection from the tool support to the motor including a gear, a stop on the gear, a fixed stop, and an adjustable stop, the last two stops being in the path of movement of the first stop and being operative to mechanically stop the respective opposite rotations of the gear and motor.

16. A tool feeding mechanism for planers or the like comprising in combination, a tool support, a rotary element operatively connected to the tool support, an electric motor, a non-positive driving connection from the motor to the element, a stop rigid with the element, and a pair of relatively adjustable stops in the path of movement of the first stop for mechanically and definitely stopping the respective opposite rotations of the element and motor.

17. A tool feeding mechanism for planers or the like comprising in combination, a tool support, an electric motor, an operative connection from the tool support to the motor including a rotary element, a stop on the element, a pair of relatively adjustable abutment stops in the path of movement of the first stop for mechanically stopping the respective opposite rotations of the element and motor, and resilient means in the driving connection between the motor and the element whereby to absorb the shock occasioned by the stops.

18. A tool feeding mechanism for planers or the like comprising in combination, a tool support, a gear operatively connected to the tool support, a driving element adjacent and coaxial of the gear, spring means providing a shock absorbing and driving connection between the gear and element in either direction, an electric motor connected to the element, a stop on the gear, and a pair of relatively adjustable stops in the path of movement of the first stop for mechanically stopping the respective opposite rotations of the gear and motor.

19. A tool feeding mechanism for planers or the like comprising in combination, a tool support, a feed shaft operatively connected to the support, a driving shaft parallel with the feed shaft, a gear keyed to the driving shaft, a pinion loose on the feed shaft and in mesh with the gear, a gear loose on the driving shaft, a clutch for connecting the loose gear to its shaft, means for continuously rotating the keyed gear in either direction, the loose gear being adapted to be rotated through the clutch, stop means for adjustably limiting the opposite rotations of the loose gear, and means for connecting either the pinion or loose gear to the feed shaft.

20. A tool feeding mechanism for planers or the like comprising in combination, a tool support, a feed shaft operatively connected to the support, a driving shaft parallel with the feed shaft, a gear keyed to the driving shaft, a pinion loose on the feed shaft and in mesh with the gear, a gear loose on the driving shaft, a clutch for connecting the loose gear to its shaft, means for connecting either the pinion or loose gear to the feed shaft, and means operative to disconnect the clutch when connecting the pinion to the feed shaft.

21. A tool feeding mechanism for planers or the like comprising in combination, a plurality of tool supports, a plurality of feed shafts operatively connected to the supports, a driving shaft parallel with the feed shafts, a gear keyed to the driving shaft, a pinion loose on each feed shaft and in operative connection with the gear, a gear loose on the driving shaft, a clutch for connecting the loose gear to its shaft, means for optionally connecting any pinion to its shaft and for operatively connecting the loose gear to such shaft, and means operative to disconnect the clutch when connecting any one of said pinions to its shaft.

22. A tool feeding mechanism for planers or the like comprising in combination, a tool support, a feed shaft operatively connected to the support, a driving shaft parallel with the feed shaft, a gear keyed to the driving shaft, a pinion loose on the feed shaft and in mesh with the gear, a gear loose on the driving shaft, a ratchet pinion mounted non-rotatably on the feed shaft, means for optionally sliding the ratchet pinion into mesh with the loose gear and into clutching engagement with the loose pinion, a clutch for connecting the loose gear to its shaft, a spring for normally engaging the clutch, and means operative to disengage the clutch when clutching the ratchet pinion to the loose pinion.

23. A tool feeding mechanism for planers or the like comprising in combination an upright, a cross rail thereon, tool supports mounted on the upright and cross rail, means for feeding and traversing said supports, and means automatically operative to disconnect the operating connection to the upright support when traversing the rail support.

24. A tool feeding mechanism for planers or the like comprising in combination an upright, a cross rail thereon, tool supports mounted on the upright and cross rail, an electric motor, means for feeding and traversing said supports from the motor, the operating connection to the upright support including a vertical shaft and a clutch, and means automatically operative to disconnect the clutch when traversing the rail support.

25. A tool feeding mechanism for planers or the like comprising in combination a pair of uprights, a cross rail thereon, tool supports mounted on the uprights and cross rail, means for feeding and traversing said supports, and means automatically operative to disconnect the operative connection to the upright supports when traversing the rail support.

26. A tool feeding mechanism for planers or the like comprising in combination a pair of uprights, a cross rail thereon, a plurality of tool supports on the cross rail, a tool support on each upright, an electric motor, means for feeding and traversing said supports from the motor, the operating connection to the upright supports including two vertical shafts and clutches therefor, and means automatically operative to disconnect the clutches when traversing any of the rail supports.

27. A tool feeding mechanism for planers or the like comprising in combination an upright, a cross rail thereon, tool supports mounted on the upright and cross rail, means for feeding and traversing said supports, and means automatically operative to disconnect the feeding conection to the rail support and the operating connection to the upright support when traversing the rail support.

28. A tool feeding mechanism for planers or the like comprising in combination an upright, a cross rail thereon, tool supports mounted on the upright and cross rail, an electric motor, means for feeding and traversing said supports from the motor, the feeding connection to the rail support and the operating connection to the upright support including clutches, and means automatically operative to disconnect the clutches when traversing the rail support.

29. A tool feeding mechanism for planers or the like comprising in combination a pair of uprights, a cross rail thereon, a plurality of tool supports on the cross rail, a tool support on each upright, an electric motor, means for feeding and traversing said supports from the motor, and means automatically operative to disconect the feeding connection to the rail supports and the operating connection to the upright supports when traversing any of the rail supports.

30. In a machine tool, the combination of a pair of uprights, a cross rail thereon, power operated means for moving the rail on the uprights, means including a clamping shaft for clamping the rail to the uprights, a clutch for engaging the rail moving power means, and means operative to disengage the clutch when rotating the clamping shaft to clamp the rail.

31. In a machine tool, the combination of a pair of uprights, a cross rail thereon, power operated means including a shaft extending along the rail for moving the rail on the uprights, means including a manually operated parallel shaft extending along the rail for clamping the rail to the uprights, a clutch for engaging the rail moving power means, a spring for normally engaging the clutch, and means operative to disengage the clutch when rotating the clamping shaft to clamp the rail.

32. A tool operating mechanism for planers or the like comprising in combination, a pair of uprights, a cross rail thereon, power means, means operated by the power means for moving the rail on the uprights, a plurality of tool supports, means operated by the power means for feeding and traversing the supports, and means automatically operative to disconnect the power from the feeding and traversing means when connecting the rail moving means to the power.

33. A tool operating mechanism for planers or the like comprising in combination, a pair of uprights, a cross rail thereon, an electric motor, means for moving the rail on the uprights from the motor, a tool support, mechanism operatively connecting the tool support to the motor, a switch for controlling the continuous operation of the motor for moving the rail and traversing the tool support, and means automatically operative to disconnect the said connection to the tool support when using the motor to move the rail.

34. A tool operating mechanism for planers or the like comprising in combination, a pair of uprights, a cross rail thereon, a motor, means including a clutch for moving the rail on the uprights from the motor, a plurality of tool supports, means including a clutch for traversing the supports from the motor, and means automaticaly operative to disengage the traversing clutch when engaging the rail moving clutch.

35. A tool operating mechanism for planers or the like comprising in combination, a pair of uprights, a cross rail thereon, a motor, means including clutch means for moving the rail on the uprights from the motor, a plurality of tool supports, means including clutch means for feeding and traversing the supports from the motor, and means automatically operative to disengage either of the said clutch means when engaging the other clutch means.

36. A tool operating mechanism for planers or the like comprising in combination, a pair of uprights, a cross rail thereon, power means, means including a clutch operated by the power means for moving the rail on the uprights, means including a clamping shaft for clamping the rail to the uprights, a plurality of tool supports, means operated by the power means for feeding and traversing the supports, and means operative to engage the said clutch and to disengage the power from the feeding and traversing means when rotating the clamping shaft to unclamp the rail.

37. A tool operating mechanism for planers or the like comprising in combination, a pair of uprights, a cross rail thereon, a motor, means including a clutch for moving the rail on the uprights from the motor, means including a clamping shaft for clamping the rail to the uprights, a plurality of tool supports, means including a clutch for feeding and traversing the tool supports from the motor, and means operative to respectively engage and disengage the first and second mentioned clutches when unclamping the rail and for respectively disengaging and engaging such clutches when clamping the rail.

38. A tool operating mechanism for planers or the like comprising in combination, a pair of uprights, a cross rail thereon, a tool support on one upright, two parallel shafts extending along the rail, a power element operatively connected to one shaft, means including a clutch operatively connecting such shaft to the tool support, means operated by the other shaft for moving the rail on the uprights, a clutch for connecting the two shafts, means including a third parallel shaft for clamping the rail to the uprights, and means whereby the first said clutch is disengaged and the second clutch engaged when the third shaft is rotated to unclamp the rail.

39. A tool operating mechanism for planers or the like comprising in combination, a pair of uprights, a cross rail thereon, a tool support on one upright, power operated means on the rail for optionally moving the rail on the uprights and operating the tool support, a power element, means including a clutch for connecting the first said means with the power element, a second tool support, an operative connection from the power element to the second tool support, and means for disengaging the said clutch when desiring to operate the second tool support independently of the cross rail and the first mentioned tool support.

40. A tool operating mechanism for planers or the like comprising in combination, a pair of uprights, a cross rail thereon, tool supports mounted on the uprights and cross rail, means for feeding and traversing said supports, a unitary device operative to disconnect the feeding mechanism when desiring to traverse the tool supports on the uprights, and means whereby the device may be operated to disconnect the feeding mechanism and one upright connection when desiring to traverse the tool support on the other upright.

41. A tool operating mechanism for planers or the like comprising in combination, a pair of uprights, a cross rail thereon, tool supports mounted on the uprights and cross rail, means for feeding and traversing said supports, a clutch for controlling each upright support, a device operative to disconnect the feeding mechanism when desiring to traverse the tool supports on the uprights, means whereby the device may be operated to disconnect the feeding mechanism and one upright clutch when desiring to traverse the tool support on the other upright, and means whereby the device may be operated to disengage both said clutches.

42. A tool operating mechanism for planers or the like comprising in combination, a tool support, an electric motor, mechanism providing feeding and traversing connections from the motor to the support, a switch for controlling the continuous operation of the motor to traverse the support, and means preventing movement of the switch for traversing when the feeding mechanism is in the operative position.

43. A tool operating mechanism for planers or the like comprising in combination, a tool support, an electric motor, mechanism providing feeding and traversing connections from the motor to the support, the said feeding connection including clutch means, a switch for controlling the motor to traverse the support, and means preventing movement of the switch for traversing when the said clutch means is engaged for feeding.

44. A tool operating mechanism for planers or the like comprising in combination, a plurality of tool supports, an electric motor, mechanism providing feeding and traversing connections from the motor to the supports, a switch for controlling the motor to traverse the supports in either direction, and means preventing movement of the switch for traversing in either direction when the feeding mechanism is in the operative position.

45. A tool operating mechanism for planers or the like comprising in combination, an upright, a cross rail thereon, a tool support on the rail, an electric motor on the rail, mechanism on the rail providing feeding and traversing connections from the motor to the support, a switch for controlling the motor to traverse the support, and means preventing movement of the switch for traversing when the feeding mechanism is in the operative position.

46. A tool operating mechanism for planers or the like comprising in combination, a pair of uprights, a cross rail thereon, an electric motor, means for moving the rail on the uprights from the motor, a tool support, means for feeding and traversing the support from the motor, a switch for controlling the continuous operation of the motor for moving the rail and traversing the tool support, and means preventing such operation of the switch when the motor is connected to the tool support for feeding.

47. A tool operating mechanism for planers or the like comprising in combination, a pair of uprights, a cross rail thereon, an electric motor, means for moving the rail on the uprights from the motor, a tool support, mechanism providing feeding and traversing connections from the motor to the support, the said feeding and traversing connections including two clutches, a switch for controlling the continuous operation of the motor for moving the rail and traversing the tool support, means operative to prevent such movement of the switch when the clutches are engaged, and means operative to permit such movement of the switch when either of the clutches is disengaged.

48. A tool operating mechanism for planers or the like comprising in combination, a pair of uprights, a cross rail thereon, an electric motor, means for moving the rail on the uprights from the motor, means for clamping the rail to the uprights, a tool support, means for feeding and traversing the support from the motor, a switch for controlling the continuous operation of the motor for moving the rail and traversing the tool support, an obstruction preventing such operation of the switch when the motor is connected to the tool support for feeding, and means operative to disconnect the feeding connection to the motor and remove the said obstruction from the switch when unclamping the rail from the uprights.

49. A tool operating mechanism for planers or the like comprising in combination, a pair of uprights, a cross rail thereon, an electric motor, a tool support, means including clutch means for feeding and traversing the support from the motor, a switch for controlling the continuous operation of the motor for traversing the tool support, an obstruction preventing such operation of the switch when the motor is connected to the tool support for feeding, and means operative to disconnect the feeding connection to the motor and remove the said obstruction from the switch when engaging the clutch means for traversing.

50. A tool operating mechanism for planers of the like comprising in combination, a pair of uprights, a cross rail thereon, an electric motor, means for moving the rail on the uprights from the motor, means for clamping the rail to the uprights, a tool support, means including clutch means for feeding and traversing the support from the motor, a switch for controlling the continuous operation of the motor for moving the rail and traversing the tool support, means preventing such operation of the switch when the motor is connected to the tool support for feeding, and means operative to disconnect the feeding connection to the motor and to render the switch so operative when either unclamping the rail from the uprights or engaging the clutch means for traversing the tool support.

51. In a planer or the like, the combination of an upright, a cross rail thereon, tool supports on the upright and cross rail, an electric motor, a screw on the cross rail threadedly connected to the tool support thereon, a shaft on the rail operatively connected to the tool support on the upright, and means for operatively connecting the motor to the screw and shaft, the said means and motor being operative to rotate the screw and shaft continuously for traversing the tool supports or to intermittently rotate the screw and shaft a predetermined amount for feeding the tool supports and the said means being adjustable to vary such amount.

52. In a planer or the like, the combination of an upright, a cross rail thereon, tool supports on the upright and cross rail, an electric motor on the rail, a screw on the rail threadedly connected to the tool support thereon, a shaft on the rail operatively connected to the tool support on the upright, and means on the rail for operatively connecting the motor to the screw and shaft, the said means and motor being operative to rotate the screw and shaft continuously for traversing the tool supports or to intermittently rotate the shaft and screw a predetermined amount for feeding the tool supports and the said means being adjustable to vary such amount.

53. In a planer or the like, the combination of an upright, a cross rail thereon, a tool support, means including a shaft on the rail operatively connected to the tool support, an electric motor, means providing an operative connection from the motor to the said shaft for feeding and traversing the tool support, and means operative from the said shaft for moving the rail on the upright.

54. In a planer or the like, the combination of an upright, a cross rail thereon, screw threaded means for moving the rail on the upright, means for clamping the rail to the upright, a plurality of tool supports, a plurality of shafts on the rail each operatively connected to a tool support, power means, means for operatively connecting the shafts to the power means for feeding and traversing the supports, and means for connecting one of the shafts to the said screw threaded means for moving the rail from the power means.

In testimony whereof we hereto affix our signatures.

HAROLD L. BLOOD.
ROSWELL H. RAUSCH.
CHARLES W. JENSEN.
HARRY LITTLE.